Patented Apr. 16, 1935

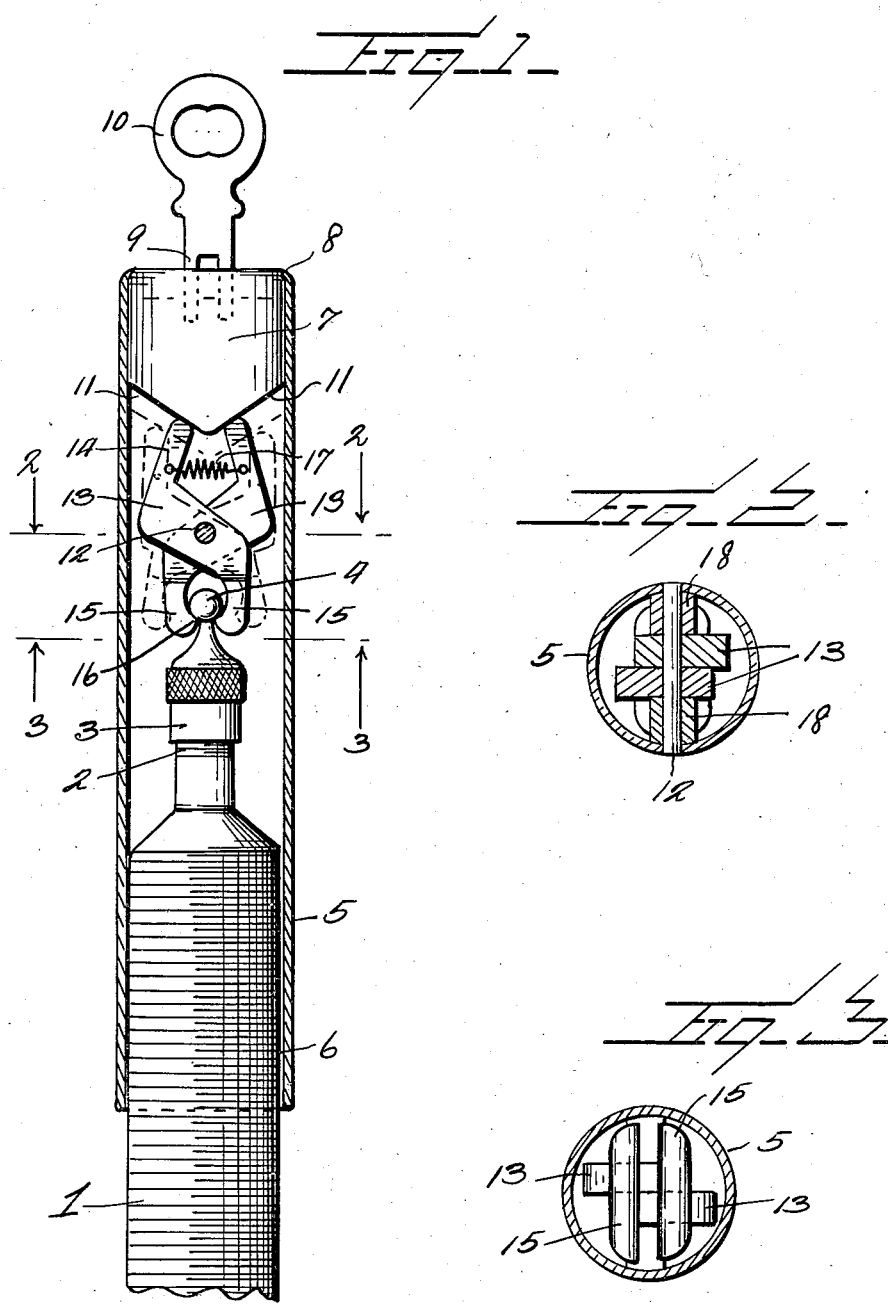

1,998,050

UNITED STATES PATENT OFFICE 1,998,050

VALVE STEM CAP LOCK

Frank N. Gasdorf, Cincinnati, Ohio

Application December 6, 1934, Serial No. 756,374

4 Claims. (Cl. 152—12)

This invention relates to automobile tire valves and pertains particularly to means for housing and shielding the same.

The primary object of the present invention is to provide a device by which the valve stem cap of a motor vehicle tire valve may be enclosed, and secured in such a way to the enclosing body that the cap will be effectively shielded or protected against tampering by unauthorized persons.

Another object of the invention is to provide a tire valve stem cap securing means in which a sleeve encases the valve stem and the cap on the stem is engaged by a gripping element within the sleeve so that the sleeve cannot be removed from the stem without releasing the gripping element, the manipulation of which is accomplished by the use of a key.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in longitudinal section of the device embodying the present invention, showing the same applied to a valve stem.

Figure 2 is a sectional view taken on the line 2—2 of Figure 1.

Figure 3 is a sectional view taken on the line 3—3 of Figure 1.

Referring to the drawing wherein like numerals of reference designate corresponding parts throughout the views, the numeral 1 designates a motor vehicle tire valve stem of the usual character which is threaded in the usual manner for engagement by a shield element which the present invention is designed to replace. The upper end of the stem 1 is reduced and threaded, as indicated at 2, to receive the cap 3 which, as is well known, has a gasket inside which closes the upper end of the stem to prevent the entrance of dirt and the escape of any air which may pass the valve element which the stem encases. These caps 3 as constructed in the latest types of valves are provided with ball heads or tips, as indicated at 4. The present invention comprises a relatively long cylinder body 5 which is interiorly threaded at one end about the area indicated by the numeral 6, for engagement with the threaded portion of the stem 1 when the cylinder or sleeve is placed over the stem in the manner illustrated.

The upper end of the sleeve 5 encases a reciprocable body 7 which is maintained against removal from the sleeve by the slightly inturned flange 8 and which has its outer end face provided with suitable apertures to receive the prongs 9 of a key member 10. This body 7 at its inner end is formed to provide the two cam faces 11 which converge at the central part of the sleeve 5 in the manner illustrated, forming substantially a V.

Extending transversely of the sleeve 5 beneath the convergent portions of the cam surfaces 11 is a pin 12 and upon this pin are placed in side by side relation the two oppositely extending arms 13, each of which has an obliquely extending finger 14 at its upper end and a jaw 15 at its lower end. The jaws 15 are relatively long, extending transversely of the sleeve 5, as illustrated in Figure 3, and the under faces of the same are rounded, as illustrated, so that the ball head 5 of the cap 3 may be readily forced up therebetween. The edges 16 of the jaws are relatively sharp so that when they come together beneath the head 4, they will securely grip it and thus prevent the head slipping back from between them in the event that an unauthorized person attempted to unscrew the sleeve from the stem.

The fingers 14 are maintained in upwardly convergent relation, as illustrated in Figure 1, by a spring 17 which connects them together in the manner illustrated. When these fingers are in this convergent relation, the body 7 is in the raised position and the jaws are together in the position which they assume when gripping the top 4 of the cap. The spring thus serves to hold the jaws in gripping position.

The pin 12 may have mounted thereon suitable spacing sleeves 18 disposed at opposite sides of the arms 13 to maintain the latter in position in the center of the sleeve 15. In the use of the present device, the sleeve 5 is threaded down upon the valve stem 1 until the ball top or head 4 of the cap is forced between the jaws into the position in which it is illustrated in Figure 1. The jaws under the urge of the spring 17 will thus maintain a firm grip upon the cap so that the removal of the sleeve cannot be effected without the manipulation of the member 7 which constitutes a spreader member for the fingers 14. When the cap is to be released so that the sleeve may be removed, the key 10 is engaged with the body 7 and the latter forced downwardly to the position indicated by dotted lines so as to spread the fingers 14 and open the jaws to the positions in which they are shown in dotted outline. While holding the key and spreader member 7 down, the sleeve 5 can then be rotated to unscrew it from the stem 1 and the housing sleeve removed.

From the foregoing, it will be readily apparent that with the device embodying the present invention, the tire valve stem cap will be effectively protected from tampering by unauthorized persons and will in addition be shielded from injury.

What is claimed is:—

1. Securing means for the cap of a threaded valve stem, comprising a body adapted to receive and threadably engage the stem, gripping means carried within the body for engaging the cap upon the stem, and means for releasing the gripping means to permit the removal of the body.

2. Securing means for the cap of a threaded valve stem, comprising a body adapted to receive and threadably engage the stem, relatively movable jaw elements carried by and within the body in a position to grip said cap, means normally urging said jaws into gripping relation, and means within the body for effecting the shifting of said jaws to open or non-gripping position.

3. Securing means for the cap of a tire valve stem, comprising a sleeve threaded to receive said stem in one end, an element shiftably mounted in the other end of the sleeve for movement in a longitudinal direction therein, a pair of pivotally mounted jaws within the sleeve arranged to engage said cap when the latter has been threaded to a predetermined position on the stem, means normally urging said jaws into gripping relation, and means forming a part of said longitudinally shiftable body to effect the relative shifting of the jaws to non-gripping position.

4. Securing means for the cap of a tire valve stem, comprising a sleeve interiorly threaded in one end to receive and engage said stem, a pair of jaw members pivotally mounted within the sleeve in a position to engage said cap therebetween when the sleeve has been threaded to a predetermined position on the stem, a finger carried by each of said jaws, a spring connecting said fingers to normally urge the same in one direction and to move the jaws into gripping relation, a body in the other end of the sleeve and adapted to move longitudinally therein, and a pair of camming surfaces forming a part of said body and arranged when the body is shifted in one direction to separate said fingers against the action of said spring to open said jaws.

FRANK N. GASDORF.